April 1, 1930. M. TURNQUIST 1,752,312
HINGE DEVICE
Filed March 4, 1927
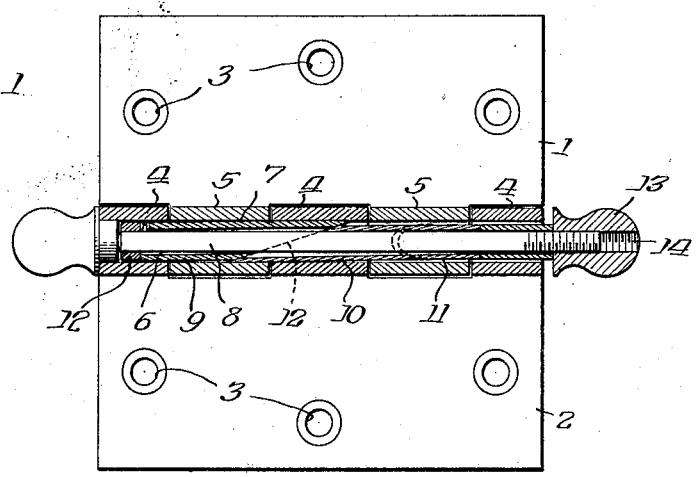
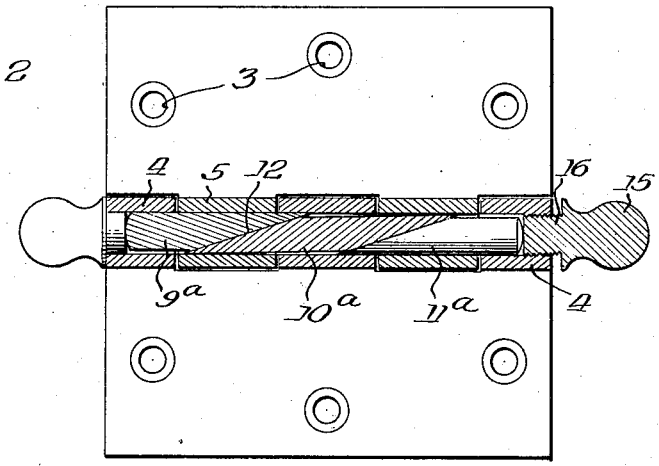
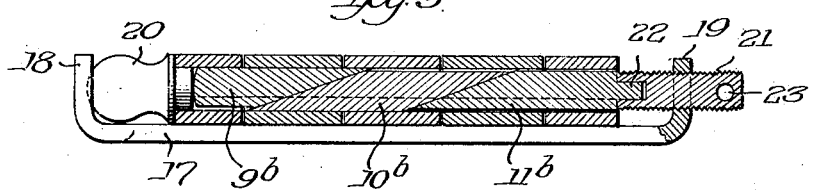

Patented Apr. 1, 1930

1,752,312

UNITED STATES PATENT OFFICE

MAGNUS TURNQUIST, OF CHICAGO, ILLINOIS

HINGE DEVICE

Application filed March 4, 1927. Serial No. 172,648.

My invention relates to friction pins, which are capable of use in various places, as for example in hinges where a friction pin may be employed to exert friction to retard or stop the swinging action of the hinge.

One of the objects of the invention is to provide a simple, practical and advantageous construction of friction pin.

Another object of the invention is to arrange for the ready operation of the pin so that it may be caused to exert friction or not, as desired.

Another object of the invention is to arrange for the quick, effective and convenient actuation of the pin.

Another object of the invention is to provide a construction which may be readily used in various other devices, as for example, in hinges and the like.

In the accompanying drawing—

Fig. 1 is a view partially in elevation and partially in section of a hinge provided with a friction pin involving my invention.

Fig. 2 is a similar view of a modified form of construction and

Fig. 3 is a cross-sectional view of a still further modified form.

Referring to the drawings, I show in Fig. 1, a hinge involving the two leaves 1 and 2, each provided with screw holes 3, 3. The hinge portion of the device consists of the tubular parts or members 4, 4, and 5, 5, whereof the members 4, 4, are secured to, preferably made integral with the hinge member 1, and the hinge portions 5, 5 secured to and preferably made integral with hinge member 2.

Within the tubular channel formed by these parts 4, 5, is a pin 6, preferably a friction pin embodying my invention. This pin 6 preferably comprises a tubular outside member 7 and an interior central or spindle member 8. The outer member 7 is preferably made of parts or sections such as 9, 10 and 11 and these parts or sections are preferably provided with inclined or slanting ends 12, which fit together but also permit a certain amount of relatively sliding movement. When these parts 9, 10 and 11 are in alignment the pin member 7 is of substantially the same size throughout its length, namely, the size or width or diameter of said parts 9, 10 and 11.

However, when said parts are moved or slid relatively to one another so as to become more or less out of alignment, the effective width or thickness or diameter of said member 7 is increased as shown in Fig. 1. This will have a friction effect on any outside or surrounding device or member, as for example, the tubular arrangement formed by the parts 4 and 5 and this friction effect will cause a binding as between the friction pin and the outer or surrounding member for various purposes. For example, in the hinge shown, the friction pin will cause a binding effect on the tubular structure of the hinge and so exercise a retarding or binding effect on the two leaves of the hinge so as to prevent or tend to prevent movement of said leaves relatively to one another.

As an arrangement for forcing the parts 9, 10 and 11 toward one another to exert the friction action, I show a nut 12 on one end of the spindle 8 and a rotary thumb nut or head 13 on the other end of said spindle, which other end is screw threaded as at 14. Thus, by turning the head 13, said head will press inwardly upon the end member 11 and cause it to slide relatively to member 10 and also cause member 10 to slide relatively to member 9 thereby in effect, thickening the tubular portion of the pin and causing it to exert its friction action. To release the friction effect the member 13 may be turned in opposite direction, so as to permit said members 9, 10 and 11 to become in alignment and relieve the friction effect.

The combined structure consisting of a spindle 8 and head 12 thereon is preferably made in unitary form so that it may be bodily removed from the interior of the tubular portion of the hinge and also be bodily inserted into the same.

Referring to Fig. 2 I show a modification in which there are relatively removable pin parts 9ª, 10ª and 11ª, having inclined or sloping surfaces 12 permitting them to slide relatively to one another and these are fitted within the tubular hinge structure composed of parts 4 and 5 as in the previous construction. No central spindle is employed in this arrangement however, but on the other hand, a head 15 having a threaded plug portion 16 is arranged to fit into a threaded socket at the end of the endmost member 4 and this permits the end action on the slidable pin or members to cause friction action of the same.

In the arrangement of Fig. 3, a pin construction consisting of members 9$^b$, 10$^b$ and 11$^b$ is shown arranged generally as in the preceding construction. A clamping member 17, however is shown and this has upturned ends 18 and 19 whereof the end 18 engages one head 20 and the other end 19 has a threaded socket to receive a threaded plug member 21. This latter preferably fits over a pin or projection 22 at the end of the member 11$^b$ and is provided with an aperture 23 by which it may be turned so as to exert the compressing or endwise pressure action on the pin structure to obtain the friction effect.

It will be understood that changes and modifications may be made without departing from the spirit of the invention.

What I claim is:

1. A hinge device comprising swinging leaves and a plurality of members which are provided with means for causing them to slide lengthwise of one another, and causing them to move laterally when they are so slid lengthwise, said members having inclined abutting surfaces by which the lengthwise sliding and laterally projecting movement is secured; said means for causing initial lengthwise movement comprising a screw threaded member engaging one end of the said pin.

2. A hinge device having two matched swinging leaves, the matched portions thereof constituting a cylindrical bore; a pin in the bore; said pin composed of sections longitudinally disposed with respect to each other and to the said bore; said sections having diagonally opposed end surfaces arranged to slidingly engage each other; the said sectional pin having its extreme ends formed substantially perpendicular to the axis thereof, and means engaging the said ends and arranged to slide the said diagonal contiguous surfaces upon each other, said engaging means including a screw threaded member arranged so as to cause said sliding action to displace the said sections out of coaxial alignment with each other.

3. A hinge device having two matched swinging leaves, the matched portions thereof formed to constitute a cylindrical bore; a composite pin in the bore; the contiguous surfaces of said composite pin being formed on an acute angle with respect to the axis thereof; screw threaded means engaging one end of the pin for causing the component parts to move longitudinally and by virtue of the angularity of their meeting ends to simultaneously move laterally.

In witness whereof, I hereunto subscribe my name this 23d day of February, A. D. 1927.

MAGNUS TURNQUIST.